Patented June 10, 1947

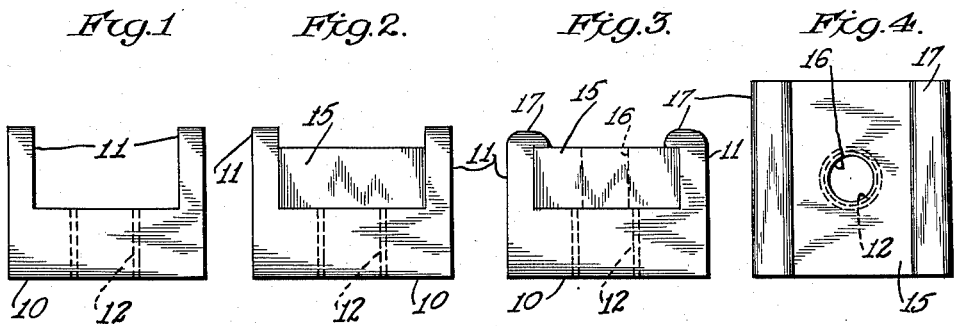
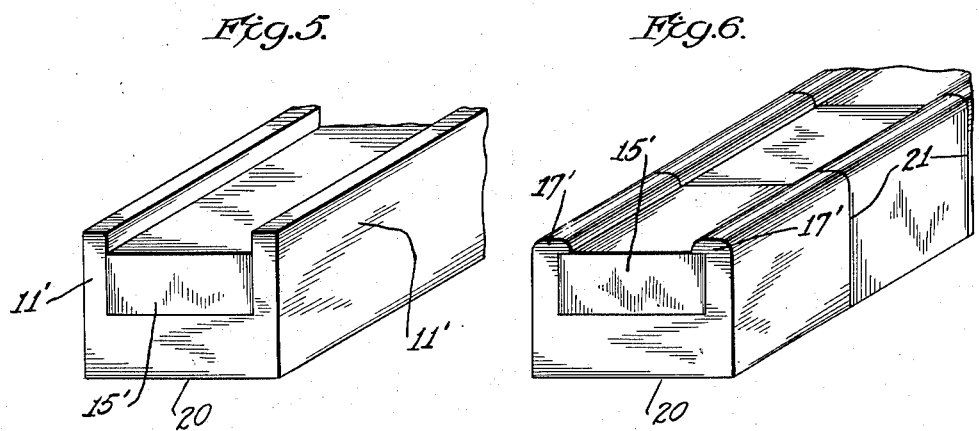
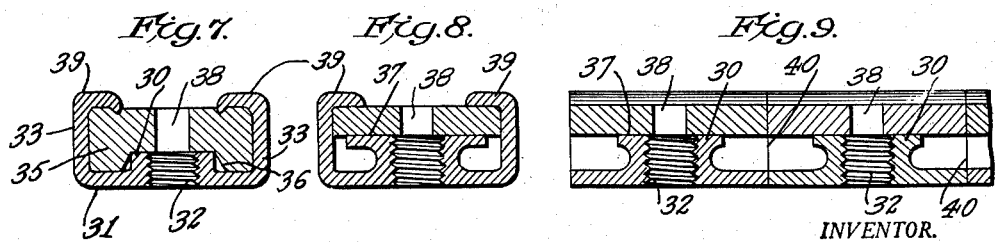

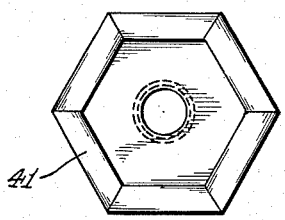
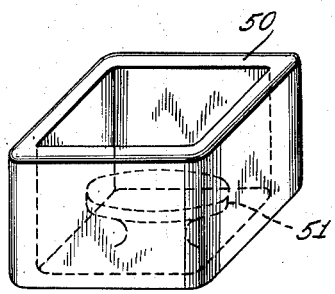
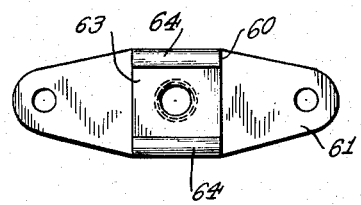
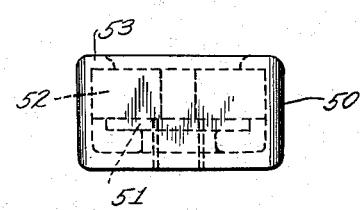
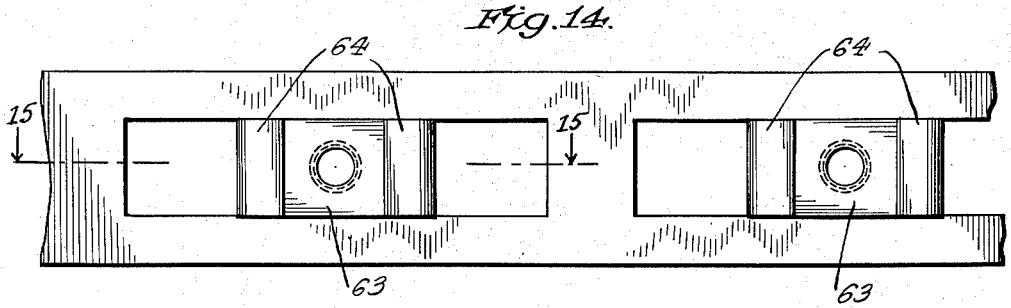
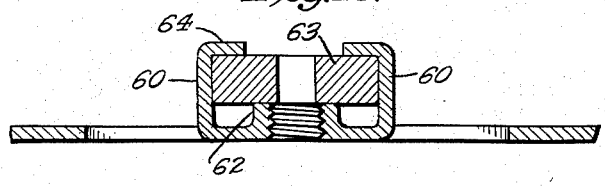

2,421,905

UNITED STATES PATENT OFFICE 2,421,905

METHOD OF MAKING SELF-LOCKING NUTS

Walter M. Perry, Darien, Conn.

Application June 28, 1944, Serial No. 542,520

3 Claims. (Cl. 10—86)

This invention relates to self-locking nuts of the type which employs a fibre insert for the purpose of effecting locking between the nut and the bolt. Such locking nuts are well known, but it is also known that their manufacture requires considerable machining and assemblying of parts which makes these nuts relatively expensive. It is, therefore, one of the principal objects of this invention to provide a self-locking nut of the fibre-insert type which requires a minimum of machining operations and which is, therefore, relatively inexpensive to manufacture and which can be manufactured in large quantities and in less time than is required at the present time for other such types of nuts.

It is a further object of my invention to provide a self-locking nut of the fibre-insert type which can be quickly and inexpensively produced from sheet metal, thus reducing the weight of the nut which is a prime factor in reducing the inertia and, therefore, reduces the forces which act to loosen the nut.

It is a further object of my invention to provide a self-locking nut of the fibre-insert type in the form of anchor-type nuts.

It is a further object of my invention to provide a form of self-locking nut of the fibre-insert type which can be readily and inexpensively manufactured in the form of long continuous strips.

Further objects and advantages of this invention will become apparent in the following detailed description thereof.

In the accompanying drawings,

Fig. 1 is an end view of a piece of metal stock showing the first steps in the method of making one form of my self-locking nut.

Fig. 2 is a view similar to Fig. 1 showing the next step in which the fibre has been inserted.

Fig. 3 is a view similar to Figs. 1 and 2 showing the final steps in which the sides of the metal stock are folded over to grip the fibre and the fibre has been bored.

Fig. 4 is a plan view of the Fig. 3 form of nut.

Fig. 5 is an isometric projection showing steps in the method of forming a plurality of the type of self-locking nuts shown in Fig. 3, from a single, long strip of stock.

Fig. 6 is a view similar to Fig. 5 showing the final steps in the method of forming a plurality of lock nuts from a single strip.

Fig. 7 is a vertical section through another form of lock nut made from sheet metal but embodying the same principles of my invention as in the Figs. 1 to 6 forms.

Fig. 8 is a view similar to Fig. 7 showing a modified form of fibre-insert and support therefor.

Fig. 9 is a side elevation showing the method of forming a plurality of nuts of the Fig. 8 type from a single strip of sheet metal.

Fig. 10 is a plan view showing the method of forming a lock nut from sheet metal, said nut being completely enclosed on all sides to form a polygonal exterior.

Fig. 11 is an isometric projection showing a step in the formation of still another form of lock nut embodying my invention and made from a single piece of sheet metal.

Fig. 12 is an end view showing the completed form of lock nut begun in Fig. 11.

Fig. 13 is a plan view showing a method of forming an anchor-type lock-nut.

Fig. 14 is a plan view showing a method of forming anchor-type lock nuts as a continuous strip.

Fig. 15 is a section taken on the line 15—15 of Fig. 14.

Referring first to Figs. 1 to 4 inclusive, I have shown one form of my self-locking nut of the fibre-insert type which embodies the fundamental principles of this lock nut and the method of forming the same. The nut is formed from a piece of metal having a base 10 from which there is extended upwardly sidewalls 11, preferably at right angles to the base 10. A bolt-receiving passageway 12 is drilled through the center of the base and threaded. A rectilinear opening is thus provided between the sidewalls and the ends of the base, and within this opening there is positioned a fibre strip 15 designed to fill the space between the sidewalls and extending from one end of the base to the other. The next step consists in folding over or crimping the excess portions 17 of the sides 11 extending above the fibre insert 15 so that they grip the fibre as shown in Fig. 3. The fibre is provided with a hole 16 drilled or punched therethrough in axial alignment with the threaded passageway 12.

Thus, it will be seen that by a minimum of operations there is obtained a self-locking nut of the fibre-insert type, which can not only be made quickly and inexpensively, but results in an efficient self-locking nut of this type.

To facilitate further the manufacture of nuts of the type disclosed in Figs. 1 to 4 inclusive, a plurality of these nuts may be formed from a single strip of metal. Thus, for example, as shown in Figs. 5 and 6, a relatively long strip of metal stock 20 may be extruded with sidewalls 11', the length of the strip 20 being equal to that of a plurality of nuts. Holes 12 are drilled, the distance between the centers of adjacent holes being substantially equal to the length of one nut. The fibre insert 15', also in the form of a long strip substantially equal in length to that of metal strip 20, is then inserted between the walls 11' which extend above the fibre insert. The excess portions 17' of the sidewalls are then folded over to grip the length of fibre strip. Holes 16 are then drilled or punched in the fibre strip in axial alignment with the holes 12. The long, united metal and fibre strips may then be severed into individual lock nuts by making transverse cuts 21 midway between adjacent holes.

The novel type of lock nut and method of making the same, described hereinbefore in connection with Figs. 1 to 6, may be applied either to metal stock or sheet metal. In the case of sheet metal as shown in Fig. 7, a hub 30 is first extruded from the strip of sheet metal which forms a base 31. The hub may be provided with a threaded hole 32 for receiving the bolt. Two side members 33 may be turned up from the base 31 preferably at right angles thereto, and then a strip of fibre 35 is inserted between the sidewalls and the hub and base. The fibre 35 may have a bore 36 to receive the hub and permit the fibre to rest on the base 31 as well as on the hub 30, or as shown in Fig. 8, the fibre may rest solely upon the flattened top 37 of the hub. In either case, the next step consists in folding over or crimping the excess portions 39 of the sides 33 until they grip the fibre and hold it firmly in place.

This form of my invention may also be made from long strips of sheet metal from which a plurality of such nuts may be obtained. Thus, for example, as shown in Fig. 9 a long strip of sheet metal is provided with a plurality of hubs 30 extruded from the base, each hub 30 having a threaded hole 32, and the distance between the centers of the holes being equal to the length of one nut. A long strip of fibre substantially equal in length to that of the sheet metal strip is inserted between the upturned walls 33, the walls extending above the fibre. The excess portions of the sidewalls are then crimped over the long fibre insert. Holes 38 may be drilled or punched through the fibre insert in axial alignment with holes 32, and then the long united metal and fibre strips may be severed into single lock nut lengths by transverse saw cuts 40.

In the forms of the invention disclosed hereinbefore, the lock nut is formed with a plurality of sides only two of which are metal, the other 2 having open fibre ends. The same methods of manufacture out of sheet metal may be employed to provide lock nuts which have all their sides protected by metal. Thus, for example, as shown in Fig. 10 a sheet metal stamping provided with six sides 41 may have a hexagonal fibre inserted between the six sides, after which the excess portions of the sides are crimped over in the same manner as in the Figs. 7, 8 and 9 forms of the invention.

If desired, the lock nut may be formed of a single strip of sheet metal. A hub 51 is first extruded from the base and the sheet is then drawn up into the shape of a cup 50 as shown in Fig. 11, which may have a rectilinear, hexagonal or any other desired polygonal exterior. A fibre insert 52 is positioned within the cup in engagement with the hub and the sidewalls. The excess portions 53 of the sidewalls are then crimped over the fibre insert.

The same methods described hereinbefore may be employed for producing a self-locking nut of the anchor-types, as shown in Fig. 13. In this form, a pair of ears 60 are punched out of a sheet metal strip 61, and bent up on lines parallel to the length of the strip. A hub 62 is extruded from the base of the sheet midway between the opposing ears 60 as shown in Fig. 15, and the fibre 63 is inserted between the ears 60 and rests upon the hub. The excess portions 64 of the ears 60 are then crimped over the fibre.

This form of anchor-type self-locking nut may be formed in long continuous strips as shown in Figs. 14 and 15. Pairs of ears 60 are punched out (in this form, on lines transverse to the length of the strip) at any desired distances along the length of the strip, a hub 62 is extruded between each pair of ears, a fibre is inserted between each pair of ears and adapted to rest on the hub, and the ears are then crimped over the fibre. A series of lock-nuts is thus formed.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of forming a plurality of self-locking nuts of the fibre-insert type from a long strip of sheet metal, which consists in extruding a plurality of hubs from the base, providing a hole through each hub and threading each hole, the distance between the centers of the holes corresponding substantially to the length of the nut, bending up only two opposed portions of the strip in the same direction from the base as the hubs, inserting a strip of fibre, the fibre strip being adapted to rest on the hubs and against the opposed portions of the metal strip, the opposed portions of the metal strip extending above the fibre, bending over the excess of the opposed portions of the metal strip to grip the upper surface of the fibre strip, providing holes in the fibre strip in axial alignment with the holes in the base, and cutting off lengths of the metal and fibre strips midway between the holes to form a plurality of individual nuts.

2. The method of forming a self-locking nut of the fibre-insert type from a strip of sheet metal, which consists in extruding a hub from the base, providing a hole through said hub and threading the hole, bending up opposed portions of the strip in the same direction from the base as the hub, inserting a fibre adapted to rest against the opposed portions of the metal strip and having a bore in the base thereof adapted to receive the hub and permit the fibre to rest against the hub and base of the metal strip, the opposed portions of the metal strip extending above the fibre, turning over the excess of the opposed portions to grip the upper surface of the fibre, and providing a hole in the fibre in axial alignment with the hole in the base.

3. The method of forming a plurality of self-locking nuts of the fibre-insert type from a long strip of sheet metal, which consists in extruding a plurality of hubs from the base, providing a hole through each hub and threading each hole, the distance between the centers of the holes corresponding substantially to the length of the nut, bending up opposed portions of the strip in the same direction from the base as the hubs, inserting a strip of fibre, the fibre strip being adapted to rest against the opposed portions of the metal strip and having a plurality of bores in the base thereof adapted to receive the hubs and permit the fibre strip to rest against the hubs and base of the metal strip, the opposed portions of the metal strip extending above the fibre, bending over the excess of the opposed portions of the metal strip to grip the upper surface of the fibre strip, providing holes in the fibre strip in axial alignment with the holes in the base, and cutting off lengths of the metal and fibre strips midway between the holes to form a plurality of individual nuts.

WALTER M. PERRY.

REFERENCES CITED

The following references are of record in the file of this patent:

UNITED STATES PATENTS

| Number | Name | Date |
|---|---|---|
| 1,874,829 | Swanstrom | Aug. 30, 1932 |
| 1,990,718 | Swanstrom | Feb. 12, 1935 |
| 2,217,714 | Swanstrom | Oct. 15, 1940 |
| 135,864 | Thompson et al. | Feb. 11, 1873 |
| 154,851 | Dittman | Sept. 8, 1874 |
| 2,321,497 | Luce | June 8, 1943 |
| 2,340,589 | Harpoothian | Feb. 1, 1944 |
| 2,381,936 | Sargent | Aug. 14, 1945 |

FOREIGN PATENTS

| Number | Country | Date |
|---|---|---|
| 559,248 | Great Britain | Feb. 10, 1944 |